(12) United States Patent
Lindenschmidt et al.

(10) Patent No.: US 7,370,745 B2
(45) Date of Patent: May 13, 2008

(54) HYDRAULIC CLUTCH-RELEASE SYSTEM

(75) Inventors: Christoph Lindenschmidt, Rheinstetten (DE); Urban Panther, Seelbach (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 277 days.

(21) Appl. No.: 11/093,577

(22) Filed: Mar. 30, 2005

(65) Prior Publication Data

US 2005/0217963 A1 Oct. 6, 2005

(30) Foreign Application Priority Data

Mar. 31, 2004 (DE) .................. 10 2004 015 656

(51) Int. Cl.
*F16D 25/08* (2006.01)
*F16D 25/10* (2006.01)

(52) U.S. Cl. .............. 192/87.11; 192/48.8; 192/85 CA; 192/98

(58) Field of Classification Search ...................... None
See application file for complete search history.

(56) References Cited

U.S. PATENT DOCUMENTS 4,440,281 A * 4/1984 Hauguth .................. 192/48.8
6,634,477 B2 * 10/2003 Beneton et al. ............ 192/48.8
7,080,722 B2 * 7/2006 Vogt et al. ................. 192/48.8
2005/0155835 A1 * 7/2005 Hans ....................... 192/87.11

FOREIGN PATENT DOCUMENTS

| DE | 100 64 459 | 9/2001 |
| EP | 0 077 837 | 11/1982 |
| FR | 2 604 228 | 3/1988 |
| GB | 1 295 593 | 4/1971 |

* cited by examiner

*Primary Examiner*—Richard M Lorence
(74) *Attorney, Agent, or Firm*—Davidson, Davidson & Kappel

(57) ABSTRACT

A hydraulic clutch-release system has a dual-piston clutch actuator for actuating a twin clutch of an automated manual transmission of a vehicle. The actuator has pistons disposed coaxially with one another in a housing. The pistons are accommodated movably relative to one another in cooperating cylinder chambers for actuating the diaphragm springs of a clutch of the twin clutch. Mutually facing regions of the lateral surfaces of the pistons are in contact.

19 Claims, 1 Drawing Sheet

HYDRAULIC CLUTCH-RELEASE SYSTEM

Priority is claimed to German patent application 10 2004 015 656.5, filed Mar. 31, 2004, the entire disclosure of which is hereby incorporated by reference herein.

The present invention is directed to a hydraulic clutch-release system having a dual-piston clutch actuator for actuating a twin clutch of an automated manual transmission, in particular of a parallel manual transmission, or parallel shift gearbox, of a vehicle, having pistons disposed coaxially with one another in a housing, which are each accommodated movably relative to one another in respective cooperating cylinder chambers of the housing, for actuating a diaphragm spring of each clutch of the twin clutch.

BACKGROUND

From automotive technology, various clutch-release systems are known for actuating a clutch of an automated manual transmission. For example, hydraulic clutch-release systems having a hydraulically actuated clutch actuator are used for actuating the two clutches of a twin clutch. These clutch-release systems can be dual annular-piston clutch actuators (dual CSC), for example. In the case of a dual-piston clutch actuator, the diaphragm springs of each clutch are actuated by the annular pistons.

It has been shown that twin clutches require the largest possible hydraulic surface. However, this, in turn, also increases the bearing diameter for a release bearing, as well as for the cover bearing of a housing in which the annular pistons are accommodated.

Thus, the known hydraulic system for actuating the twin clutch in the case of a parallel manual transmission has two pistons disposed coaxially with one another, which are accommodated in a housing and are used for actuating the diaphragm springs of the associated clutches of the twin clutches.

SUMMARY OF THE INVENTION

An object of the present invention is to provide an increased size of the hydraulic transmission surface while maintaining a specified size, or provide a reduced size of the dual-piston clutch actuator.

The present invention provides a hydraulic clutch-release system having a dual-piston clutch actuator for actuating a twin clutch of an automated manual transmission, in particular of a parallel manual transmission of a vehicle, having pistons disposed coaxially with one another in a housing, which are accommodated movably relative to one another in cooperating cylinder chambers, for actuating the diaphragm springs of a clutch of the twin clutch, mutually facing regions of the lateral surfaces of the pistons being in contact.

Accordingly, a clutch-release system according to the present invention is provided in which the housing of the dual-piston clutch actuator does not have any additional housing wall between the two pistons accommodated in the housing. In this manner, the required housing diameter is minimized, and the required bearing diameter of the housing cover is thus likewise reduced, without the size of the hydraulic surface of the pistons being reduced in the process. Thus, given a same bearing diameter, the approach according to the present invention renders possible a larger hydraulic surface than in known clutch-release systems, i.e., while continuing to use a housing diameter customary under known methods heretofore, it is possible to use larger dimensioned release bearings and, thus, also correspondingly dimensioned annular pistons, thereby allowing higher forces to be transmitted.

Within the scope of one advantageous embodiment of the present invention, it may be provided for the mutually facing regions of the peripheral surfaces of the pistons to slide sealingly against each other over the entire periphery, thereby providing a mutual separation of the cylinder chambers cooperating, respectively, with the pistons. Thus, by the pistons sliding against each other, a common cylinder wall is effectively formed, which, in conjunction with the particular housing part, constitutes the piston guidance. The two pistons may slide against each other over the entire peripheral region. It is also conceivable, however, for a tongue and groove connection or the like to be used, for example, for centering purposes.

To achieve an optimal utilization of space, it is provided for the pistons (annular pistons) accommodated in the housing to be positioned so as to be axially offset from one another. This enables the two diaphragm springs of the clutches of the twin clutch to be actuated independently of one another, without necessitating a larger bearing diameter. The inner piston may preferably project further in the axial direction than the outer piston. However, other positioning possibilities are also conceivable.

To adequately seal off the medium contained in the respective cylinder chambers, means for sealing the particular cylinder chamber may be provided, for example, at least on the regions of the peripheral surfaces of each piston facing the housing. To provide sealing action, these means may include suitable sealing profiles or the like, and be made of plastic, for example, or also of other materials.

In order to also seal off the housing in the area of the mutually facing regions of the peripheral surfaces of the pistons over the entire periphery, a sealing means having a suitable sealing profile or the like may also be used in these regions.

In the clutch-release system according to the present invention, between each diaphragm spring and the cooperating piston, a release bearing is provided, which is preferably designed as a rolling element bearing having two bearing shells. In this context, the end of each piston facing the release bearing may be a suitable seat for one of the bearing shells of the release bearing. For example, the seat of the bearing shell may be implemented in that the end of each piston facing the bearing has a recess or the like into which the bearing shell may be introduced in order to fix the same at this location.

BRIEF DESCRIPTION OF THE DRAWINGS

The present invention is explained in greater detail in the following, with reference to the drawings.

DETAILED DESCRIPTION

Figure 1:
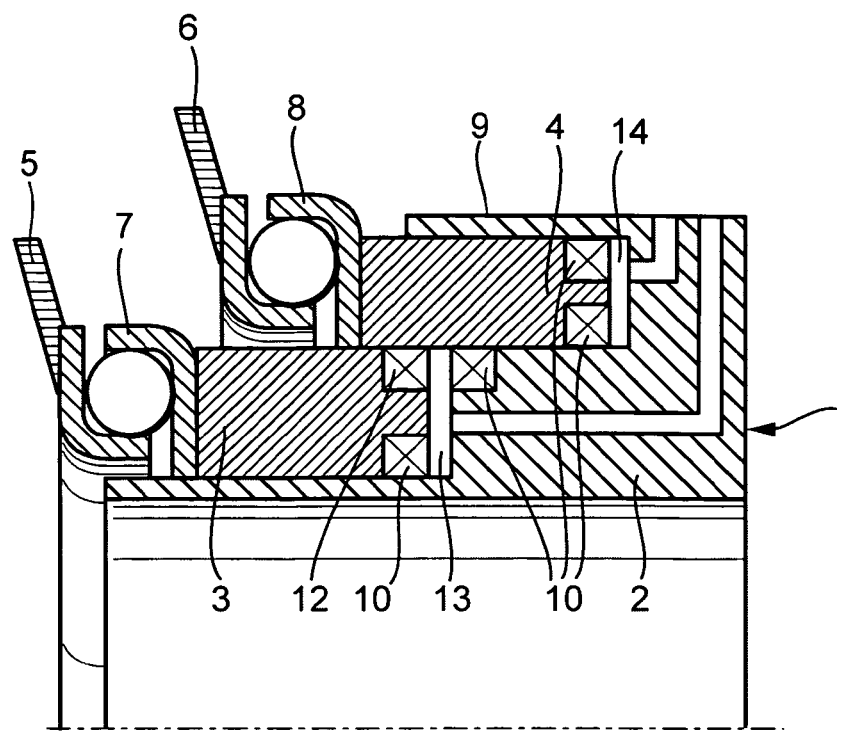
FIG. 1 shows a cross-sectional detail of one possible clutch-release system in accordance with the present invention.

In the specific embodiment shown exemplarily, the clutch-release system according to the present invention for actuating a twin clutch of a parallel manual transmission has a dual annular-piston clutch actuator 1, which includes a housing 2 having a rotationally symmetrical design.

In housing 2, two annular pistons 3, 4 disposed coaxially with one another are accommodated in cooperating cylinder chambers 13, 14, an inner annular piston 3 and an outer annular piston 4 being provided. The two annular pistons 3, 4 are movable relative to one another, so that each annular piston 3, 4 is assigned to corresponding diaphragm spring 5, 6 in order to actuate the same.

Diaphragm springs 5, 6 of the clutches (not shown in greater detail) of the twin clutch are only partially indicated in FIG. 1. A release bearing 7, 8 is provided between respective annular piston 3, 4 and associated diaphragm spring 5, 6. In this specific embodiment, each release bearing 7 and 8 is designed as a rolling bearing, the bearing shell of release bearing 7 assigned to diaphragm spring 5 being actuated by annular piston 3, and the bearing shell of release bearing 8 being correspondingly actuated by annular piston 4.

It is provided in accordance with the present invention for the mutually facing regions of the peripheral surfaces of annular pistons 3, 4 to be guided directly against each other. In this manner, the mutually facing regions of the peripheral surfaces may slide sealingly against each other, thereby providing a mutual separation between cylinder chambers 13, 14 cooperating with annular pistons 3, 4, respectively.

Accordingly, no additional housing wall is needed between annular pistons 3, 4 for separating the two cylinder chambers 13, 14. Therefore, the effective hydraulic surface of respective annular piston 3, 4 may be enlarged relative to the diameter of housing 2 and, respectively, relative to the required bearing diameter for cover 11, merely partially represented in FIG. 2. The seat of cover bearing 15 illustrated only in FIG. 2 is characterized in FIG. 1 by reference numeral 9.

To seal housing 2 and, respectively, annular pistons 3, 4 guided in housing 2, a plurality of sealing profiles 10, 12 is provided, which may be designed to have an annular form, for example, or as packed glands or the like. Reference numeral 10 denotes the sealing profiles which seal off respective cylinder chamber 13, 14 between housing 2 and the regions of the peripheral surface of each annular piston 3, 4 facing housing 2. On the other hand, sealing profile 12 provides sealing action between the mutually facing regions of the peripheral surfaces of annular pistons 3, 4 themselves.

Figure 2:
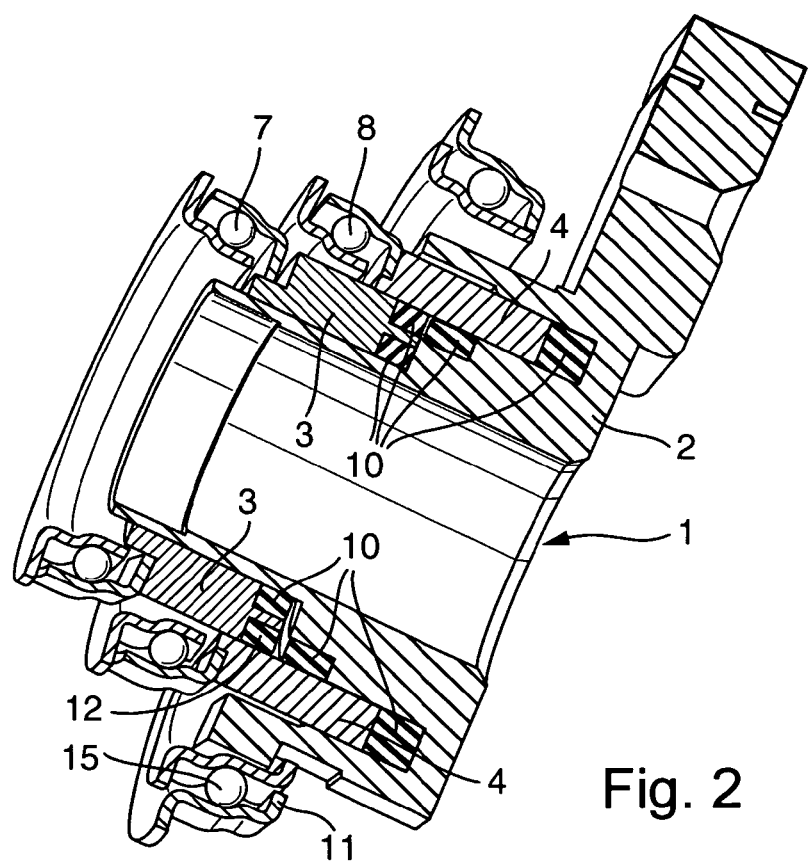
FIG. 2 shows a three-dimensional detail of a dual annular-piston clutch actuator.

Dual annular-piston clutch actuator 1 schematically illustrated in FIG. 2 may preferably be used in vehicles having a parallel manual transmission and a hydrostatic clutch-release system.

In FIG. 2, the same components are denoted by the same reference numerals as in FIG. 1.

The three-dimensionally illustrated housing 2 of dual annular-piston clutch actuator 1 of the hydraulic release system according to the present invention additionally has cover bearing 15 provided on housing 2. In particular, it is apparent from this description, how the two annular pistons 3, 4 are guided directly one inside the other, so that the diameter of cover bearing 15 is reduced, while the active hydraulic area of annular pistons 3, 4 remains unchanged.

REFERENCE NUMERAL LIST 1 dual annular-piston clutch actuator
2 housing
3 inner annular piston
4 outer annular piston
5 diaphragm spring
6 diaphragm spring
7 release bearing
8 release bearing
9 seat for cover bearing
10 sealing profile
11 cover
12 sealing profile
13 cylinder chambers
14 cylinder chambers
15 cover bearing

What is claimed is:

1. A hydraulic clutch-release system comprising a dual-piston clutch actuator for actuating a twin clutch of an automated manual transmission of a vehicle, the actuator comprising:
   a cylindrical housing;
   a first piston movably received in a first cylinder chamber in the housing and configured to actuate a first diaphragm spring of a first clutch of the twin clutch, the first piston having a first lateral surface with a first region; and
   a second piston movably received in a second cylinder chamber in the housing coaxially relative to the first piston and configured to actuate a second diaphragm spring of a second clutch of the twin clutch, the second piston having a second lateral surface with a second region facing the first region and in contact therewith, the first piston being movable in the first cylinder relative to the second piston, the second piston being movable in the second cylinder relative to the first piston,
   wherein the first and second regions are configured to slide sealingly against each other over an entire circumference of the second piston so as to separate the first and second cylinder chambers from each other.

2. The hydraulic clutch-release system as recited in claim 1 wherein the first and second pistons are annular pistons.

3. The hydraulic clutch-release system as recited in claim 1 wherein the first and second pistons are axially offset from each another in the housing.

4. The hydraulic clutch-release system as recited in claim 1 further comprising a first seal disposed at a first region of a circumference of the first piston facing the housing and configured to seal the first cylinder chamber.

5. The hydraulic clutch-release system as recited in claim 4 further comprising a second seal disposed at a second region of a circumference of the second piston facing the housing and configured to seal the second cylinder chamber.

6. The hydraulic clutch-release system as recited in claim 1 further comprising a second seal disposed at a second region of a circumference of the second piston facing the housing and configured to seal the second cylinder chamber.

7. The hydraulic clutch-release system as recited in claim 4 wherein the first seal includes at least one sealing profile.

8. The hydraulic clutch-release system as recited in claim 5 wherein the second seal includes at least one sealing profile.

9. The hydraulic clutch-release system as recited in claim 1 further comprising a seal configured to seal the first and second lateral surfaces over an entire respective circumference of each of the first and second pistons.

10. The hydraulic clutch-release system as recited in claim 1 further comprising:
    a first release bearing disposed between the first diaphragm spring and the first piston; and
    a second release bearing disposed between the second diaphragm spring and the second piston.

11. The hydraulic clutch-release system as recited in claim 10 wherein:

the first piston has a first end facing the first release bearing, the first end having a first seat for a first bearing shell; and the second piston has a second end facing the second release bearing, the second end having a second seat for a second bearing shell.

12. The hydraulic clutch-release system as recited in claim 11 wherein:

the first seat has a first profile that corresponds to a first mating part of the first bearing shell; and the second seat has a second profile that corresponds to a second mating part of the second bearing shell.

13. The hydraulic clutch release system as recited in claim 1 wherein the housing has a section located radially inwardly of the second cylinder.

14. The hydraulic clutch release system as recited in claim 1 wherein the housing has a section radially inwardly of the first chamber.

15. The hydraulic clutch release system as recited in claim 1 wherein the first chamber has an end, the first piston moving laterally with respect to the first end.

16. A hydraulic clutch-release system comprising a dual-piston clutch actuator for actuating a twin clutch of an automated manual transmission of a vehicle, the actuator comprising:

a cylindrical housing;

a first piston movably received in a first cylinder chamber in the housing and configured to actuate a first diaphragm spring of a first clutch of the twin clutch, the first piston having a first lateral surface with a first region;

a second piston movably received in a second cylinder chamber in the housing coaxially relative to the first piston and configured to actuate a second diaphragm spring of a second clutch of the twin clutch, the second piston having a second lateral surface with a second region facing the first region and in contact therewith, the first piston being movable in the first cylinder relative to the second piston, the second piston being movable in the second cylinder relative to the first piston;

a first seal disposed at a first region of a circumference of the first piston facing the housing and configured to seal the first cylinder chamber; and a second seal disposed at a second region of a circumference of the second piston facing the housing and configured to seal the second cylinder chamber.

17. A hydraulic clutch-release system comprising a dual-piston clutch actuator for actuating a twin clutch of an automated manual transmission of a vehicle, the actuator comprising:

a cylindrical housing;

a first piston movably received in a first cylinder chamber in the housing and configured to actuate a first diaphragm spring of a first clutch of the twin clutch, the first piston having a first lateral surface with a first region;

a second piston movably received in a second cylinder chamber in the housing coaxially relative to the first piston and configured to actuate a second diaphragm spring of a second clutch of the twin clutch, the second piston having a second lateral surface with a second region facing the first region and in contact therewith, the first piston being movable in the first cylinder relative to the second piston, the second piston being movable in the second cylinder relative to the first piston;

a first seal disposed at a first region of a circumference of the first piston facing the housing and configured to seal the first cylinder chamber; and a second seal disposed at a second region of a circumference of the second piston facing the housing and configured to seal the second cylinder chamber, the second seal includes at least one sealing profile.

18. A hydraulic clutch-release system comprising a dual-piston clutch actuator for actuating a twin clutch of an automated manual transmission of a vehicle, the actuator comprising:

a cylindrical housing;

a first piston movably received in a first cylinder chamber in the housing and configured to actuate a first diaphragm spring of a first clutch of the twin clutch, the first piston having a first lateral surface with a first region; and a second piston movably received in a second cylinder chamber in the housing coaxially relative to the first piston and configured to actuate a second diaphragm spring of a second clutch of the twin clutch, the second piston having a second lateral surface with a second region facing the first region and in contact therewith, the first piston being movable in the first cylinder relative to the second piston, the second piston being movable in the second cylinder relative to the first piston, wherein the housing has a section located radially inwardly of the second cylinder.

19. A hydraulic clutch-release system comprising a dual-piston clutch actuator for actuating a twin clutch of an automated manual transmission of a vehicle, the actuator comprising:

a cylindrical housing;

a first piston movably received in a first cylinder chamber in the housing and configured to actuate a first diaphragm spring of a first clutch of the twin clutch, the first piston having a first lateral surface with a first region; and a second piston movably received in a second cylinder chamber in the housing coaxially relative to the first piston and configured to actuate a second diaphragm spring of a second clutch of the twin clutch, the second piston having a second lateral surface with a second region facing the first region and in contact therewith, the first piston being movable in the first cylinder relative to the second piston, the second piston being movable in the second cylinder relative to the first piston, wherein the housing has a section radially inwardly of the first chamber.

\* \* \* \* \*